United States Patent Office 2,880,749
Patented Apr. 7, 1959

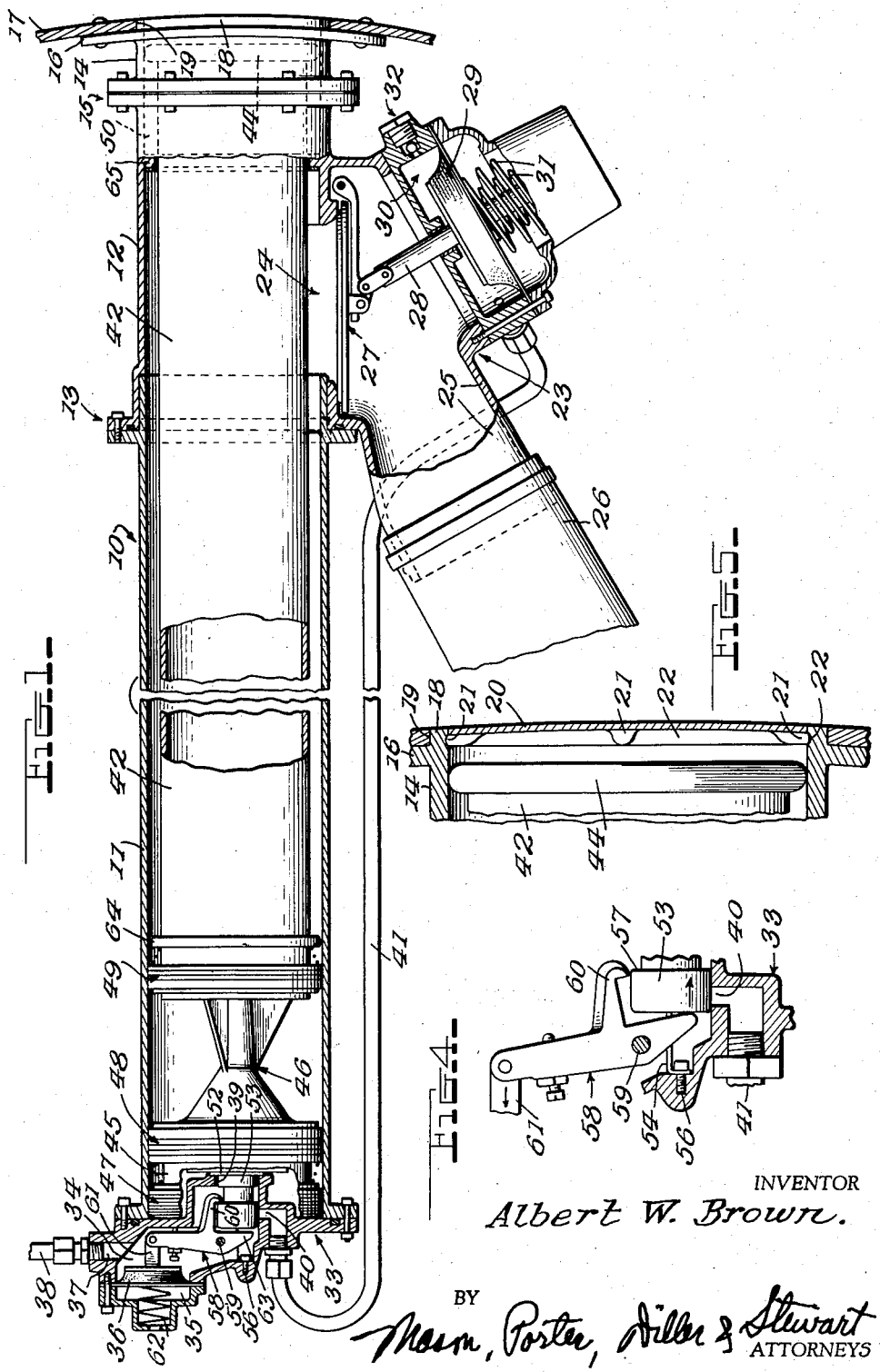

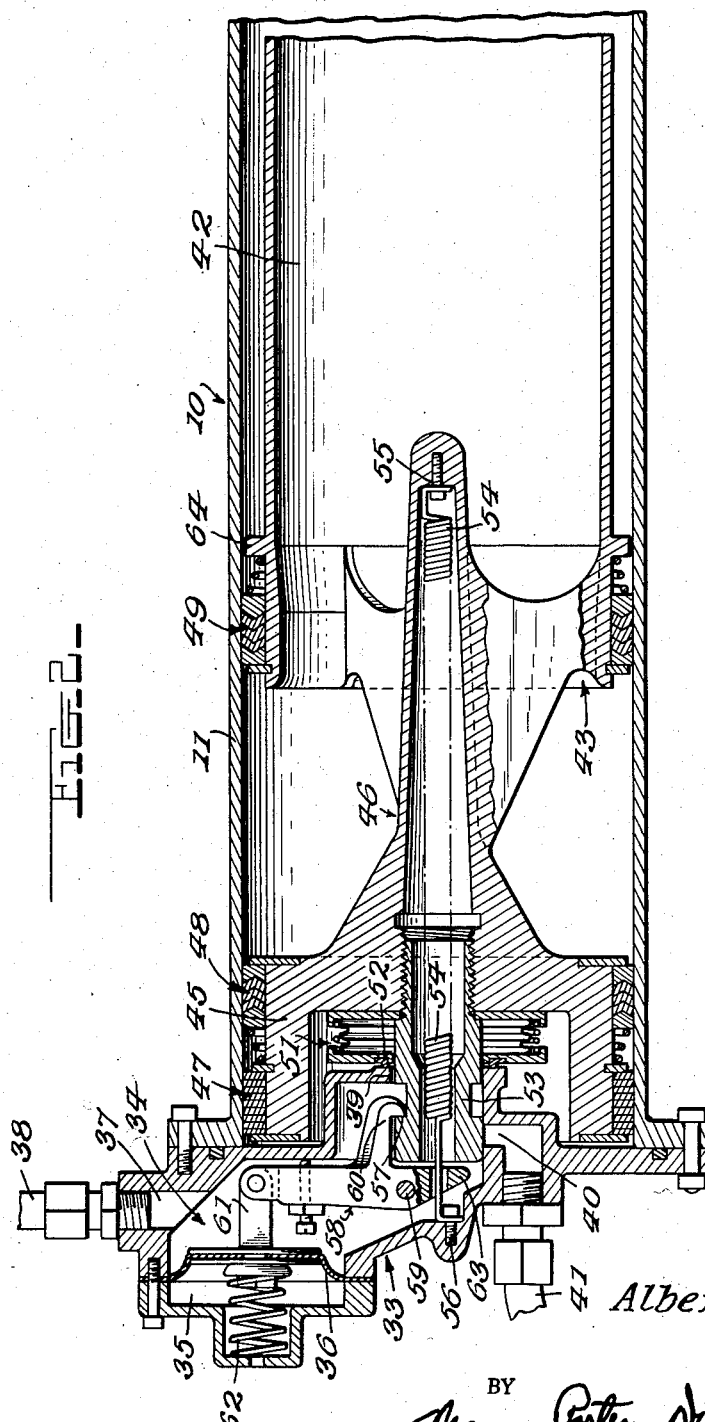

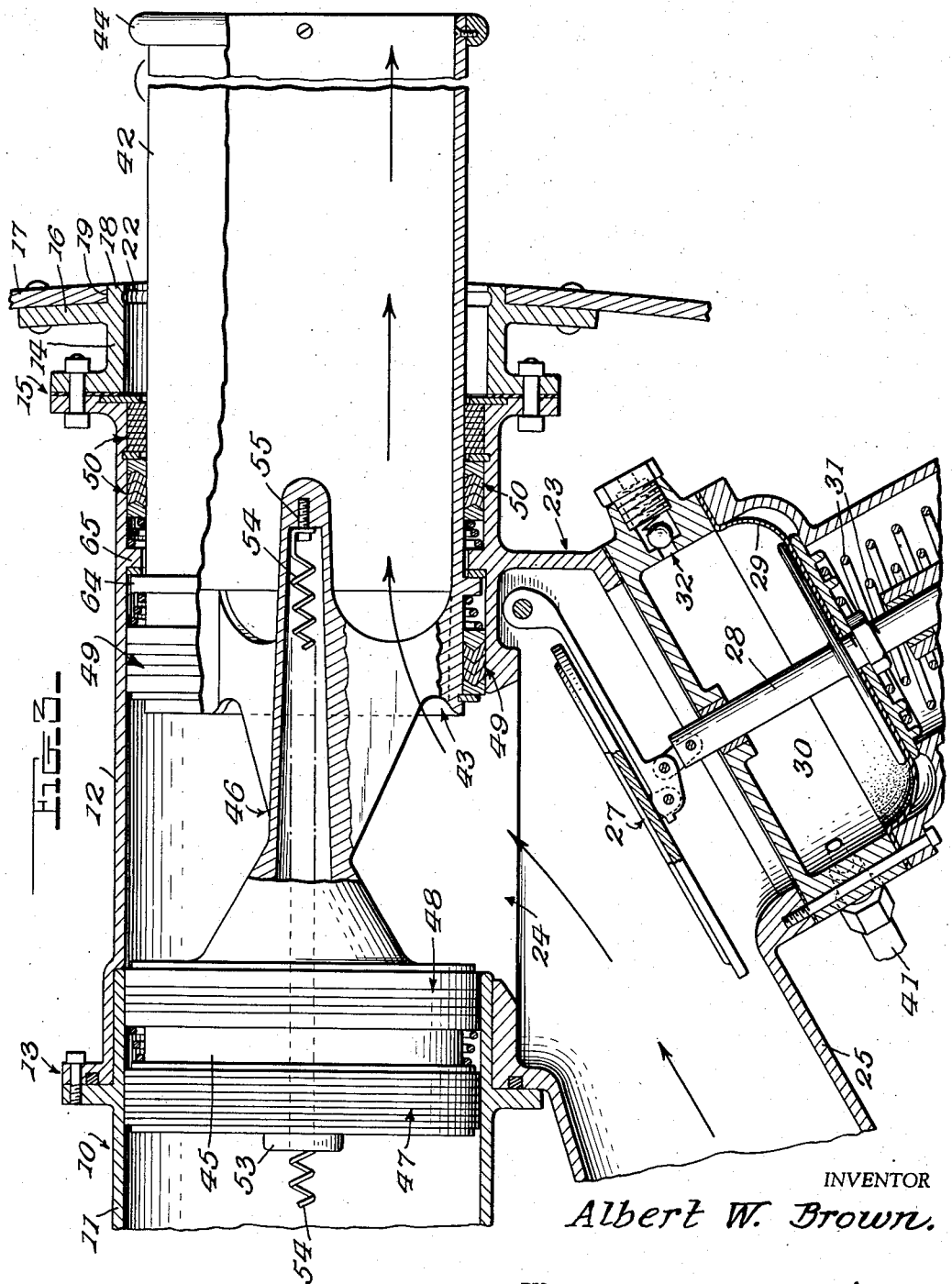

2,880,749
AIRCRAFT FUEL DUMPING MEANS
Albert W. Brown, Balboa, Calif., assignor to Parker-Hannifin Corporation, Cleveland, Ohio, a corporation of Ohio Application May 31, 1957, Serial No. 662,709
12 Claims. (Cl. 137—344)

This invention relates to a novel means for dumping fuel from the tanks of an aircraft, to decrease weight in emergency or to reduce the fire hazard in case a crash landing should be necessary.

A cylinder is provided for stationary mounting on an aircraft: and a fuel discharge tube is normally confined within said cylinder but is projectable from the same when fuel must be dumped, said tube then receiving the fuel through a fuel inlet formed in the cylinder near the outer end of the same.

The principal object of the invention is to provide a novel and reliable assembly of the type set forth, in which the fuel discharge tube is rapidly projectable by hydraulic or other actuating fluid pumped into the cylinder, said tube being provided at its inner end with a piston against which the actuating fluid thrusts when admitted through the cylinder head.

Another object is to provide the fuel discharge tube with an open inner end to receive the fuel from the fuel inlet of the cylinder and to so connect the piston with said tube that it will not interfere with the passage of the fuel into said tube.

A further object is to provide a novel latch in the cylinder head for normally holding the fuel discharge tube and its piston in retracted position, and to provide fluid-actuated means subjected to the pressure of the piston-actuating fluid, for automatically releasing said latch when the piston is to be operated.

A still further object is to provide the above mentioned latch with a portion which thrusts againt the piston and positively starts it on its travel as soon as said latch it released.

The cylinder head is formed with a chamber to receive the actuating fluid, and the latch is mounted in this chamber: and another object is to provide the piston with a projection normally extending into said chamber, said projection having a shoulder normally engaged by said latch and also having an end surface against which said latch thrusts, when released, to start the piston on its travel.

Yet another object is to provide the fuel inlet of the cylinder with a normally closed valve, and to make novel provision for automatically opening this valve when fuel is to be admitted into the discharge tube.

Still another object is to provide fluid-operated means for opening the aforesaid valve and to provide fluid conducting means communicating with the fluid chamber of the cylinder head to conduct the actuating fluid to said valve opening means.

A further object is to provide the aforesaid fluid conducting means with a fluid admission port which is normally closed by the above mentioned projection of the piston but is opened by said projection as soon as said piston starts on its travel.

A still further object is to normally close the outer end of the cylinder by means of a closure removably engaged therewith, said closure being pushed from the cylinder by the fuel discharge tube when the latter is projected.

Yet another object is to make adequate provision to insure against any hazardous leakage of fuel from any parts of the assembly.

With the above and other objects in view that will hereinafter appear, the nature of the invention will be more clearly understood by reference to the following detailed description, the appended claims and the several views illustrated in the accompanying drawings.

In the drawings:

Figure 1 is a longitudinal sectional view, partly in elevation, showing the various elements in their normal positions.

Figure 2 is an enlarged sectional view corresponding to the left hand end of Figure 1.

Figure 3 is an enlarged sectional view through the right hand end of the structure, showing the fuel discharge tube projected and the valve open for dumping fuel through said tube.

Figure 4 is a detail view, showing the piston latch released and thrusting against the piston projection.

Figure 5 is a detail view, partly in section and partly in elevation, showing the closure for the outer end of the cylinder.

The drawings disclose the preferred construction and while that construction will be rather specifically described, attention is invited to the possibility of making variations. Moreover, while the invention is shown in position to project the fuel discharge tube horizontally from a plane or other aircraft, it is to be understood that the installation could well be such as to effect downward projection of said tube.

An elongated cylinder 10 is provided, composed of a main longitudinal section 11, a shorter section 12 secured at 13 to said section 11, and an adapter 14 secured at 15 to said section 12. The adapter 14 is at the outer end of the cylinder and is flanged at 16 for attachment to the "skin" 17 of an aircraft, with the adapter extremity 18 extending into an opening 19 through said "skin." This adapter extremity is normally closed by a push-out plate 20 (Figure 5), said plate being shown as having lugs 21 removably seated in a shallow groove 22 in the inner periphery of the adapter.

The cylinder section 12 is provided with a lateral valve casing 23 and is formed with a fuel inlet 24 communicating with said casing. This casing has a fuel inlet nipple 25 for connection with a hose 26 coupled to a fuel dumping manifold (not shown) which connects the fuel tanks of the craft. A pivoted flap valve 27 is mounted in the casing 23 and normally closes the fuel inlet 24, said valve being linked to a slidably mounted rod 28 which is suitably secured to a diaphragm 29 forming one wall of a chamber 30. Springs 31 act on the rod 28 to normally hold the valve 27 closed (Figure 1). When actuating fluid is admitted into the chamber 30, this fluid acts on the diaphragm 21, overcomes the springs 31 and moves the valve 27 to open position as seen in Figure 3. An excess pressure relief valve for the chamber 30, is shown at 32.

The inner end of the cylinder section 11 is provided with a cylinder head 33 having two chambers 34 and 35 separated by a diaphragm 36. The chamber 34 is provided with an admission port 37 for communication with a line 38 extending from a pump for supplying a hydraulic fluid or other fluid under pressure to the chamber 34 when fuel dumping is required. The cylinder head is formed with an opening 39 for conducting fluid from chamber 34 into the cylinder 10; and said head has a port 40 connected by a line 41 with the chamber 30 of the casing 23 to conduct fluid from the chamber 34 to said chamber 30 to cause opening of the valve 27.

A fuel discharge tube 42 is normally confined within the cylinder 10 and has an open inner end 43 constituting a fuel inlet for communication with the inlet 24 of the cylinder when said tube 42 is projected from said cylinder, as seen in Figure 3. The outer end of this tube has a peripheral ring 44 normally seated in the adapter 14 as seen in Figures 1 and 5.

A piston 45 is spaced longitudinally from the inner end of the tube 42 and is unitarily connected with said tube by an elongated spider structure 46. The piston 45 has a piston ring assembly 47 and a sealing ring assembly 48. The inner end of the tube 42 also has a sealing ring assembly 49 and the outer end of the cylinder section 11 has sealing ring assemblies 50.

The piston 45 is of cupped form as seen in Figure 2: and within said piston, a bellows-type spring expanded seal or valve assembly 51 is mounted, the sealing ring 52 of said assembly being normally in contact with the portion of the cylinder head 33 around the opening 39. This opening normally receives a longitudinal tubular projection 53 with which the piston is provided, and the seal assembly 51 surrounds said projection. A tension spring 54 extends through this projection and the spider 46 and is connected at one end with said spider as seen at 55 in Figure 2. The other end of the spring is anchored at 56 to the cylinder head 33.

The piston projection 53 extends into the cylinder head chamber 34 and normally closes the port 40 as seen in Figure 2; and said projection has a latch-engaging shoulder 57. A latch 58 is pivotally mounted at 59 in the chamber 34 and is provided with a hook 60 normally engaging the shoulder 57 to lock the piston 45 and tube 42 in fully retracted position. One end of the latch 58 is connected at 61 with the diaphragm 36, and a spring 62 is provided to hold said latch normally engaged with the piston projection 53. The other end of the latch 58 has a nose 63 to thrust on the end of the piston projection 53 upon release of said latch.

*Operation*

The various elements normally occupy the positions shown in Figures 1 and 2 and the outer end of the adapter 14 is then closed by the plate 20. Should it be necessary to dump fuel, fluid is pumped through the line 38 into the chamber 34. This fluid acts on the diaphragm 36 to release the latch 58 and as soon as this release occurs the nose 63 thrusts against the piston projection 53, thereby starting the piston 45 and fuel discharge tube 42 on their travel. The fluid pressure then acts on the projection 43 to continue moving the piston and tube until the seal ring 52 is freed from contact with the cylinder head and said projection leaves the opening 39. The fluid pressure then enters the cylinder 10 and acts on the piston 45 to project the tube 42 from the cylinder 10 to the limit allowed by the stops 64, 65, as seen in Figure 3. In the meantime, the piston projection 53 has uncovered the port 40 and fluid flows through the line 41 to the chamber 30, thereby operating the diaphragm 29 and opening the valve 27. The fuel then flows from the tank manifold through the hose 26 into the casing 23, from this casing through the cylinder inlet 24 into the open inner end 43 of the tube 42 and discharges through this tube, as indicated by the arrows in Figure 3.

After dumping of the fuel, if pressure be exhausted from the chamber 34, the tension spring 54 will return the piston 45 and tube 42 to retracted position, the spring 62 will re-engage the latch 58 with the piston projection 53 and the springs 31 will cause reclosing of the valve 27; and if the craft safely lands, another closure plate may be inserted in place of the plate 20 which was pushed out by the tube 42 during projection of the latter.

From the foregoing, it will be seen that a novel and advantageous construction has been disclosed for attaining the desired ends. However, attention is again invited to the possibility of making variations within the scope of the invention.

I claim:

1. In a fuel dumping means, a cylinder, a head closing one end of said cylinder, a fuel discharge tube within said cylinder, a piston adjacent said head and connected with said tube for projecting the latter beyond said cylinder, said cylinder head having a fluid chamber, a fluid supply port opening into said chamber and an opening from said chamber into said cylinder, a projection on said piston and extending longitudinally therefrom through said opening and into said chamber, said projection having a shoulder in said chamber and facing said piston, a spring applied latch mounted in said chamber at the free end of said projection, said latch being pivotally mounted for swinging movement in a plane extending longitudinally of said projection, said latch having a hook at the periphery of said projection and normally engaged with said shoulder to hold said piston in fully retracted position, said latch also having a nose in position to thrust longitudinally against said free end of said projection when said latch is swung in a direction to release said hook from said shoulder, and fluid actuated means connected to said latch for swinging the latter in said direction, said fluid-actuated means having an actuating element subjected to the fluid in the aforesaid chamber.

2. A structure as specified in claim 1; together with sealing means surrounding said projection between said cylinder head and said piston, said sealing means being movable with said projection and normally abutting said head to close the aforesaid opening.

3. A structure as specified in claim 1; together with a spring-closed fuel admission valve for said cylinder, fluid-actuated means for opening said valve, and means for conducting fluid from said chamber to said fluid-actuated means, said fluid conducting means including an entrance port normally closed by said projection but uncovered by the latter when said piston moves away from said cylinder head.

4. In a fuel dumping means for an aircraft, a cylinder for stationary mounting within the craft, said cylinder having a cylinder head at one end and having a fuel inlet near its other end, a projectable fuel discharge tube normally confined within said cylinder and projectable from said other end thereof, said tube having a fuel inlet at its inner end for communication with said fuel inlet of said cylinder when said tube is projected, a piston in said cylinder and connected with the inner end of said tube for projecting the latter, the aforesaid cylinder head having means for conducting piston-actuating fluid to said cylinder to project said piston and tube, and means for limiting the extent to which said tube may be projected by said piston; together with a closure removably engaged with said other end of said cylinder and adapted to be pushed therefrom by said tube when the latter is projected.

5. In a fuel dumping means for an aircraft, a cylinder for stationary mounting within the craft, said cylinder having a cylinder head at one end and having a fuel inlet near its other end, a projectable fuel discharge tube normally confined within said cylinder and projectable from said other end thereof, said tube having a fuel inlet at its inner end for communication with said fuel inlet of said cylinder when said tube is projected, a piston in said cylinder and connected with the inner end of said tube for projecting the latter, the aforesaid cylinder head having means for conducting piston-actuating fluid to said cylinder to project said piston and tube, and means for limiting the extent to which said tube may be projected by said piston: said cylinder having a lateral casing communicating with said fuel inlet of said cylinder, said casing having a fuel inlet, a spring-closed valve in said casing and normally closing said fuel inlet of said cylinder, fluid-actuated means connected with said valve for opening the same, said fluid-actuated means including a chamber to receive actuating fluid, and a fluid duct extending from said cylinder head to said chamber to conduct some of the fluid admitted to said cylinder head to said chamber.

6. In a fuel dumping means for an aircraft, a cylinder for stationary mounting within the craft, said cylinder having a cylinder head at one end and having a fuel inlet near its other end, a projectable fuel discharge tube normally confined within said cylinder and projectable from said other end thereof, said tube having a fuel inlet at its inner end for communication with said fuel inlet of said cylinder when said tube is projected, a piston in said cylinder and connected with the inner end of said tube for projecting the latter, the aforesaid cylinder head having means for conducting piston-actuating fluid to said cylinder to project said piston and tube, and means for limiting the extent to which said tube may be projected by said piston: said cylinder having a lateral casing communicating with said fuel inlet of said cylinder, said casing having a fuel inlet, a spring-closed valve in said casing and normally closing said fuel inlet of said cylinder, fluid-actuated means connected with said valve for opening the same, said fluid-actuated means including a chamber to receive actuating fluid, and a fluid duct extending from said cylinder head to said chamber to conduct some of the fluid admitted to said cylinder head to said chamber, said cylinder head and said piston having coacting means prohibiting fluid flow through said duct until said piston has started its tube-projecting travel.

7. In a fuel dumping means for an aircraft, a cylinder for stationary mounting within the craft, said cylinder having a cylinder head at one end and having a fuel inlet near its other end, a projectable fuel discharge tube normally confined within said cylinder and projectable from said other end thereof, said tube having a fuel inlet at its inner end for communication with said fuel inlet of said cylinder when said tube is projected, a piston in said cylinder and connected with the inner end of said tube for projecting the latter, the aforesaid cylinder head having means for conducting piston-actuating fluid to said cylinder to project said piston and tube, and means for limiting the extent to which said tube may be projected by said piston: said means for conducting piston actuating fluid to said cylinder including a fluid-receiving chamber in said head and an opening from said chamber to said cylinder, valve means carried by said piston for closing said opening while said piston remains in fully retracted position, and means normally holding said piston in said fully retracted position.

8. In a fuel dumping means for an aircraft, a cylinder for stationary mounting within the craft, said cylinder having a cylinder head at one end and having a fuel inlet near its other end, a projectable fuel discharge tube normally confined within said cylinder and projectable from said other end thereof, said tube having a fuel inlet at its inner end for communication with said fuel inlet of said cylinder when said tube is projected, a piston in said cylinder and connected with the inner end of said tube for projecting the latter, the aforesaid cylinder head having means for conducting piston-actuating fluid to said cylinder to project said piston and tube, and means for limiting the extent to which said tube may be projected by said piston: together with a spring-applied latch mounted in said cylinder head, said piston having a portion normally engaged by said latch to hold said piston in fully retracted position, and fluid actuated releasing means for said latch, said releasing means including an actuating element subjected to the fluid in said fluid conducting means of said head.

9. In a fuel dumping means for an aircraft, a cylinder for stationary mounting within the craft, said cylinder having a cylinder head at one end and having a fuel inlet near its other end a projectable fuel discharge tube normally confined within said cylinder and projectable from said other end thereof, said tube having a fuel inlet at its inner end for communication with said fuel inlet of said cylinder when said tube is projected, a piston in said cylinder and connected with the inner end of said tube for projecting the latter, the aforesaid cylinder head having means for conducting piston-actuating fluid to said cylinder to project said piston and tube, and means for limiting the extent to which said tube may be projected by said piston: together with a spring-applied latch mounted in said cylinder head, said piston having a portion normally engaged by said latch to hold said piston in fully retracted position, and fluid actuated releasing means for said latch, said releasing means including an actuating element subjected to the fluid in said fluid conducting means of said head, said latch being pivotally mounted and having a portion for positively forcing said piston from said fully retracted position when said latch is released.

10. In a fuel dumping means for an aircraft, a cylinder having an inner end and an outer end, means for stationarily mounting the cylinder within the craft with its outer end opening through an outer wall of said craft, said cylinder having a cylinder head at its inner end and having a fuel inlet opening through a side wall thereof near its outer end, a projectable fuel discharge tube normally confined wholly within said cylinder and projectable from said outer end thereof, said tube having a fuel inlet at its inner end for communication with said fuel inlet of said cylinder when said tube is projected, a piston in said cylinder and connected with the inner end of said tube for projecting the latter, the aforesaid cylinder head having means for conducting piston-actuating fluid to said cylinder to project said piston and tube, and means for limiting the extent to which said tube may be projected by said piston to present the tube in fuel dumping position, said tube being dimensioned and said limiting means being so placed as to position the tube with a major part of its length projected beyond the outer wall of the craft when in fuel dumping position.

11. In a fuel dumping means for an aircraft, a cylinder having an inner end and an outer end, means for stationarily mounting the cylinder within the craft with its outer end opening through an outer wall of said craft, said cylinder having a cylinder head at its inner end and having a fuel inlet opening through a side wall thereof near its outer end, a projectable fuel discharge tube normally confined wholly within said cylinder and projectable from said outer end thereof, said tube having an open inner end for communication with said fuel inlet of said cylinder when said tube is projected, a piston in said cylinder and normally disposed adjacent said cylinder head, an elongated spider connecting said piston with said open inner end of said tube and spacing this tube end from said piston, the aforesaid cylinder head having means for conducting piston actuating fluid into said cylinder to project said tube, and means for limiting the extent to which said tube may be projected by said piston to present the tube in fuel dumping position, said tube being dimensioned and said limiting means being so placed as to position the tube with a major part of its length projected beyond the outer wall of the craft when in fuel dumping position.

12. A structure as specified in claim 11: together with sealing means carried by and surrounding said inner end of said tube and contacting with said cylinder, and additional sealing means mounted within the aforesaid outer end of said cylinder, said additional sealing means surrounding and contacting with said tube.

References Cited in the file of this patent

UNITED STATES PATENTS

| | | |
|---|---|---|
| 613,041 | Kamerer | Oct. 25, 1898 |
| 1,518,586 | Knauf | Dec. 9, 1924 |
| 1,566,814 | Bliss | Dec. 22, 1925 |
| 2,200,922 | Heigis | May 14, 1940 |
| 2,283,502 | Hughes et al. | May 19, 1942 |